United States Patent
Hämäläinen et al.

(10) Patent No.: US 6,363,252 B1
(45) Date of Patent: Mar. 26, 2002

(54) ADVANCED METHOD FOR EXECUTING HANDOVER

(75) Inventors: Seppo Hämäläinen, Espoo; Oscar Salonaho; Niina Laaksonen, both of Helsinki; Antti Lappeteläinen, Espoo, all of (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/153,981

(22) Filed: Sep. 16, 1998

(30) Foreign Application Priority Data

Sep. 17, 1997 (FI) .................................................. 973718

(51) Int. Cl.[7] .................................................. H04Q 7/20
(52) U.S. Cl. ........................ 455/436; 455/437; 455/452; 455/509
(58) Field of Search ............................... 455/436, 437, 455/452, 509, 525

(56) References Cited

U.S. PATENT DOCUMENTS

| | | | |
|---|---|---|---|
| 5,287,544 A | * | 2/1994 | Menich et al. ............... 455/436 |
| 5,497,504 A | | 3/1996 | Acampora et al. .......... 455/33.2 |
| 5,530,917 A | * | 6/1996 | Andersson et al. .......... 455/54.1 |
| 5,561,847 A | * | 10/1996 | Kataoka ....................... 455/509 |
| 5,809,430 A | * | 9/1998 | D'Amico ..................... 455/525 |
| 5,850,605 A | * | 12/1998 | Souissi et al. ............... 455/437 |
| 5,903,843 A | * | 5/1999 | Suzuki et al. ............... 455/452 |
| 6,223,031 B1 | * | 4/2001 | Naslund ....................... 455/423 |

FOREIGN PATENT DOCUMENTS

| WO | WO 95/28808 | 10/1995 |
|---|---|---|
| WO | WO 96/37083 | 11/1996 |
| WO | WO 96/38997 | 12/1996 |
| WO | WO 97/24895 | 7/1997 |

\* cited by examiner

*Primary Examiner*—Daniel Hunter
*Assistant Examiner*—Lana Le
(74) *Attorney, Agent, or Firm*—Perman & Green, LLP

(57) ABSTRACT

A cellular radio system comprises base stations and mobile stations. In order to execute handover, there is chosen a group of potential new base stations and estimated the carrier to interference ratio that each potential new base station included in said group could offer. The carrier to interference ratio can be estimated separately for real-time and for non-real-time connections and/or for uplink and downlink connections.

15 Claims, 6 Drawing Sheets

ADVANCED METHOD FOR EXECUTING HANDOVER

TECHNICAL FIELD

In general, the invention relates to how in a cellular radio system there is made a decision that the mobile station is handed over to a new base station. In particular, the invention relates to how the different base stations are set in a priority order for the handover.

BACKGROUND OF THE INVENTION

In cellular radio systems, there is known a so-called handover procedure, according to which a data transmission connection between a mobile station and the stationary parts of the system is routed to pass via a new base station, when the connection through the old base station becomes too weak or has too much interference. For instance in a GSM system (Global System for Mobile telecommunications), each base station transmits a signal in a given so-called BCCH channel (Broadcast Control Channel), in which case the mobile stations measure the power of the received BCCH signals and determine on the basis thereof which cell is the most profitable for the quality of the radio connection. The base stations also inform the mobile stations of the BCCH frequencies used in the adjacent cells, so that the mobile station know what frequencies they must listen to in order to find the BCCH transmissions of the adjacent cells.

FIG. 1 illustrates a second-generation cellular system comprising a mobile switching centre MSC belonging to the core network CN of the cellular system, as well as base station controllers BSC and base stations BS belonging to a radio access network RAN; the mobile stations MS are in connection with said base stations. FIG. 2 illustrates the coverage areas 201a–209a of the base stations 201–209 in another second-generation cellular system.

In second-generation cellular systems, such as the GSM system, data transmission between the base stations BS and the core network CN takes place through base station controllers BSC. One base station controller normally controls a large number of base stations, so that when a mobile station moves from the area of one cell to the area of another, the base stations of both the old and the new cell are very often connected to the same base station controller. Thus the selection of a new active base station can be carried out in the base station controller. Consequently, for example in a regular GSM system there occur fairly few such inter-cell handovers where the mobile station moves from a base station connected to a first base station controller to a base station connected to a second base station controller. If this should happen, the switching centre must close the connection with the first base station controller and set up a new connection with a new base station controller. This kind of procedure includes a lot of signalling between the base station controllers and the switching centre, and because the distances between the base station controllers and the switching centre may be long, interference may occur during the selection of a new base station and a new base station controller.

A prior art arrangement for changing the active base station and base station controller is well suited to so-called second-generation digital cellular radio systems, such as GSM and its expanded version DCS1800 (Digital Communications System at 1800 MHz), IS-54 (Interim Standard 54) and PDC (Personal Digital Cellular). However, it has been suggested that in the future third-generation digital cellular radio systems, the quality of service offered by the cells for the mobile stations may considerably vary from cell to cell. Suggestions for third-generation systems are UMTS (Universal Mobile Telecommunications System) and. FPLMTS/IMT-2000 (Future Public Land Mobile Telecommunications System/International Mobile Telecommunications at 2000 MHz). In these plans, cells are divided, on the basis of their size and characteristics, for instance to pico, nano, micro and macro cells, and for example data transmission capacity can be used to describe the quality of service. The highest data transmission capacity is offered by pico cells and to the lowest in macro cells. The cells may be partly or completely superimposed, and there may be different kinds of mobile terminal devices, in which case all mobile stations cannot necessarily make use of the quality of service offered by all cells. Moreover, base stations can in different ways support services requiring real-time and non-real-time data transmission.

FIG. 3 illustrates a form of a future cellular radio system, which is not totally new for instance with respect to the known GSM system, but contains both known elements and completely new elements. The bottleneck of current cellular radio systems that hinders the offering of more advanced services to the mobile stations, is the radio access network RAN formed by the base stations and the base station controllers. The core network of the cellular radio system consists of mobile services switching centres (MSC), other network elements (in GSM for instance SGSN and GGSN connected to packet radio transmission, i.e. Serving GPRS Support Node and Gateway GPRS Support Node, where GPRS means General Packet Radio Service), and of transmission systems connected thereto. The core network is capable, in accordance with GSM+ definitions developed from GSM, of transmitting new types of services, too.

In FIG. 3, the core network of the cellular radio system 300 is a GSM+ core network 301, and three parallel radio access networks are connected thereto. Among these, networks 302 and 303 are UMTS radio access networks, and network 304 is a GSM+ radio access network. Of the UMTS radio access networks, the one illustrated topmost, i.e. 302, is for example a commercial radio access network owned by a teleoperator that offers mobile communications services and serves equally all customers who are subscribers of said operator. The lower UMTS radio access network 303 can be private, owned for instance by an enterprise in whose facilities said radio access network functions. The cells in the private radio access network 303 are typically nano and/or pico cells, and only the terminals of the employees of the owner enterprise can camp in them. All three radio access networks can contain cells that offer different types of services and vary in size. Moreover, the cells of all three radio access networks 302, 303 and 304 can be completely or partly superimposed. The bit rate applied in each case depends among others on the radio environment, features of the employed services, the regional total capacity of the cellular radio system and the capacity needs of other users. The above mentioned new types of radio access networks are in general called generic radio access networks (GRANs). Such a network can be connected to be used in cooperation with different types of core networks CN, and particularly with the GPRS network of the GSM system. A generic radio access network GRAN can be defined as a group of such base stations BS and radio network controllers RNC controlling them where the members of the group are capable of exchanging signalling messages. In the specification below, the generic radio access network is called radio network GRAN for short.

The mobile station 305 illustrated in FIG. 3 is most advantageously a so-called dual mode station that can function either as a second-generation GSM terminal or a third-generation UMTS terminal, according to what kind of services there are available in the area where it is located at the point of time in question and what are the data transmission needs of the user. It can also serve as a multi-mode terminal that can function as the mobile station of several different data transmission systems according to the needs and availability of services. The radio access networks and services available for the user are defined in the subscriber identity module SIM 306.

FIG. 4 illustrates in more detail the core network CN of a third-generation cellular radio system, the CN comprising a switching centre MSC, and the radio network GRAN connected to the core network. The radio network GRAN comprises radio network controllers RNC and base stations BS connected thereto. Now a given radio network controller RNC and the connected base stations are capable of offering services at a wide frequency band, and another radio network controller and connected base station may be capable of offering only traditional narrow-frequency services, but possibly with a larger coverage area.

FIG. 5 illustrates the coverage areas 501a–506a of the base stations 501–506 in a third-generation cellular radio system. As is observed in FIG. 5, a stationary terminal or even one that moves for a short length can select among several different base stations when setting up a radio connection.

Let us now investigate how a prior art arrangement is applied in the designed third-generation digital cellular radio system. In third-generation systems, changes of the active base station and the active radio network controller are remarkably common in comparison with second-generation systems. This is, among others, due to the fact that the cell sizes may be extremely small, and that during the radio connection, the type of service is wished to be changed for example from narrow-band to wide-band. Also the beginning or ending of various services requiring real-time or non-real-time data transmission can affect the need to change the base station or the base station controller.

A prior art measurement of the power level of the received signal in the mobile station does not give the best possible impression as to how the new base station is capable of responding to the service needs of the mobile station. If the handover of the base station and/or the radio network controller is often executed so that the new routing for the connection is not, after all, the best possible in relation to the service needs of the mobile station, the network is loaded due to unnecessary handovers. The switching centre should perform an extremely large number of connection cut-offs/setups, which requires a high amount of extra signalling between the switching centre and the radio network controllers. Moreover, in the area of one switching centre, there is a remarkably high number of small-size cells, and in wide-band applications, the quantity of user data to be transmitted also is extensive. This results in extremely high capacity and speed requirements for the switching centre equipment, which cannot in large systems be realised at reasonable costs when using the current technology.

SUMMARY OF THE INVENTION

The object of the present invention is to introduce a method and an arrangement for executing handover so that the possibilities of the base stations to offer services needed by the mobile station are taken into account.

The objects of the invention are achieved by putting the potential new base stations in priority order on the basis of the level of the carrier to interference ratio they can offer, as well as to the existing load of the base stations.

The method according to the invention is characterised in that in order to select the new base station, there is chosen a group of potential new base stations and estimated a carrier to interference ratio that each of the potential new base stations belonging to said group could offer.

The invention also relates to a cellular radio system that is characterised in that it comprises, for choosing a new base station, means for estimating the carrier to interference ratio that each of the base stations belonging to the group of potential new base stations could offer.

According to the invention, an estimate is made of each potential new base station; this estimate is based on the measured signal loss between the base station and the mobile station, on the knowledge of the total transmission power used by the base station and the interference level prevailing in the base station cell area, as well as on the knowledge of the free data transmission capacity available in the base station. These estimates are maintained continuously, and the selected new base station will be the one that is the most advantageous according to the estimate. In order to prevent a situation where the mobile station remains ping-ponging back and forth between two such base stations that have fairly similar advantages according to the estimates, there can be required a hysteresis where the mobile station hands over to a new base station only if the estimate of the new base station surpasses the estimate of the current base station for a given threshold value.

The signal loss between the base station and the mobile station is calculated by studying the difference between the transmission power of the base station on a given control or pilot channel and the respective received power at the mobile station. All base stations can use the same transmission power on the control or pilot channel, or each base station can inform the mobile station as to what power is used in any given case. In order to define the level of total transmission power and interference power, each base station calculates a given total power parameter and a given interference power parameter, and on the basis of these it is predicted how high the achieved C/I ratio (carrier to interference ratio) would be between the base station and the mobile station both in the uplink and downlink directions. In addition to this, there are calculated load factors for potential new base stations with respect to both real-time and non-real-time data transmission. In a preferred embodiment of the invention, the load parameter connected to real-time data transmission indicates whether the data transmission capacity available at the new base station is as large as the one reserved for the mobile station at the current base station, and the load parameter connected to non-real-time data transmission indicates how large a share of the data transmission capacity of the new base station allocated for non-real-time data transmission is available.

An estimate describing the advantages of the new base station is compiled of the predicted C/I ratios and load parameters, which all are preferably calculated separately for the uplink and downlink connections. The uplink and downlink directions can, when forming the estimate, be weighted differently, if it is wished to emphasizes the significance of one or the other for the handover. According to the invention, connections requiring real-time data transmission are oriented towards cells where the best C/I ratio is obtained, and connections requiring non-real-time data transmission are oriented towards cells with the best channelwise weighted C/I ratio, i.e. the largest quantity of "free"

transmission energy. From the point of view of the operation of the system, the invention attempts to maximise the C/I ratio in each connection and at the same time to minimise the total transmission power to be used, so that the available resources are optimally utilised.

BRIEF DESCRIPTION OF THE DRAWINGS

The invention is explained in more detail below, with reference to a few preferred embodiments presented by way of example, and to the appended drawings where.

In the description of the prior art above, we referred to FIGS. 1–5, and in the following description of the invention and its preferred embodiments, we shall mainly refer to FIGS. 6–8.

DETAILED DESCRIPTION OF THE INVENTION

Figure 1:
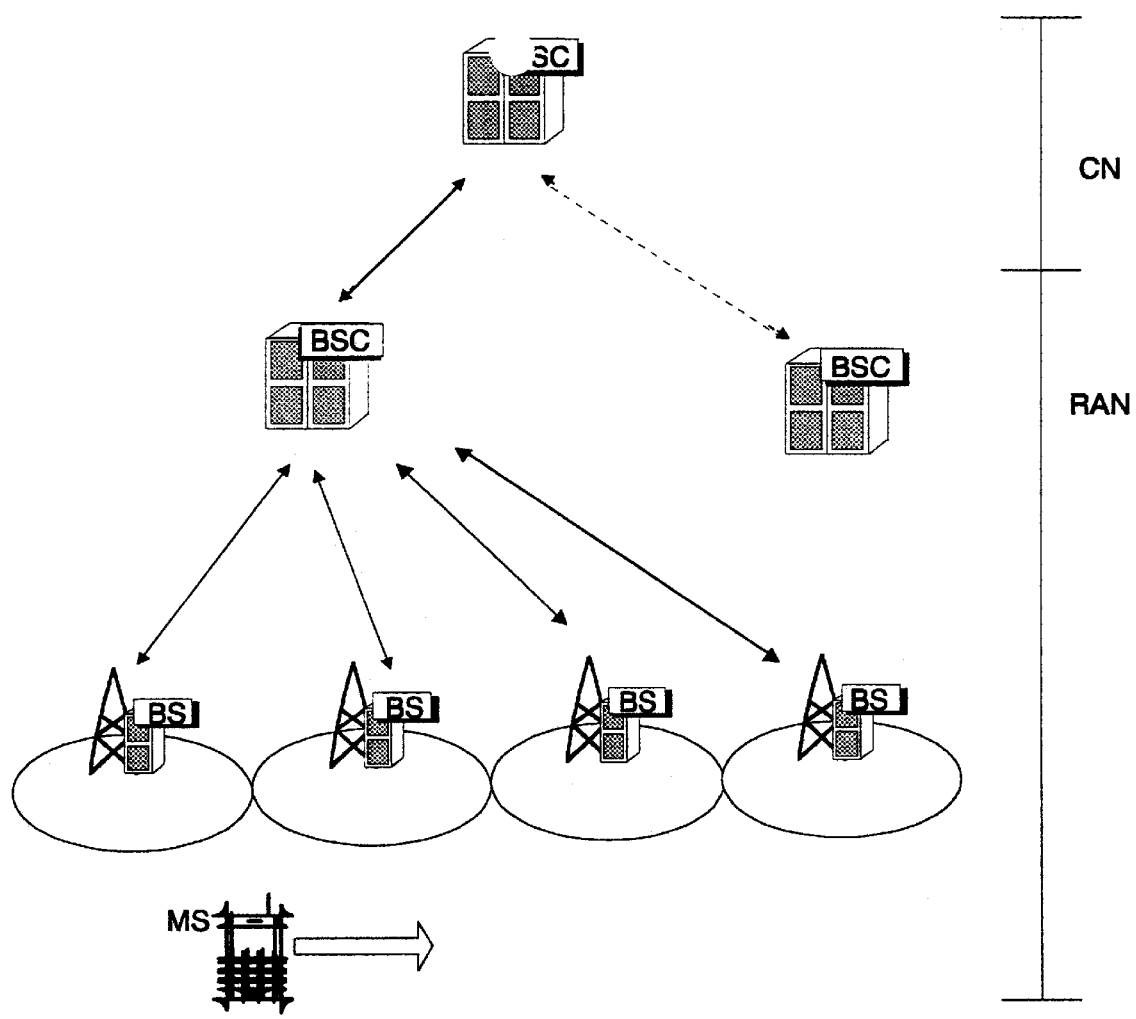
FIG. 1 illustrates a known second-generation cellular radio system.
Figure 2:
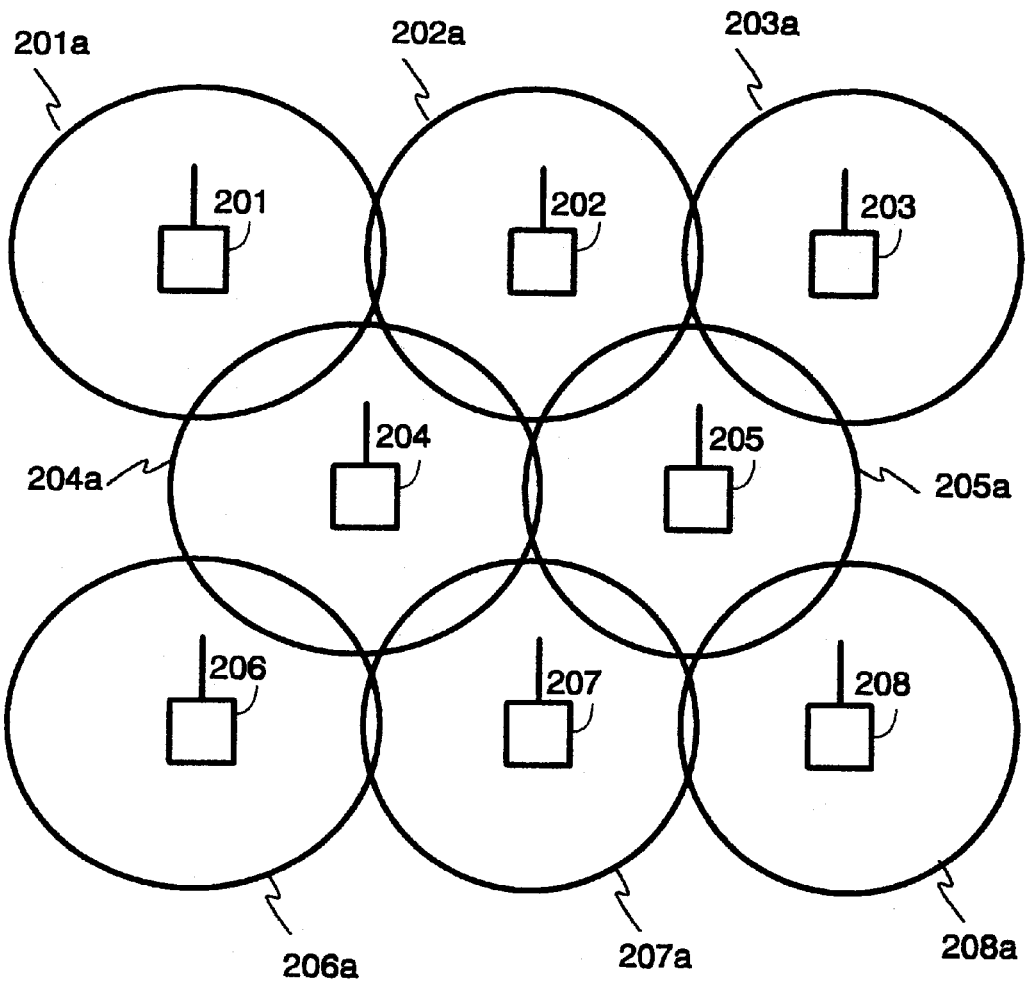
FIG. 2 illustrates some coverage areas in a system according to FIG. 1.
Figure 3:
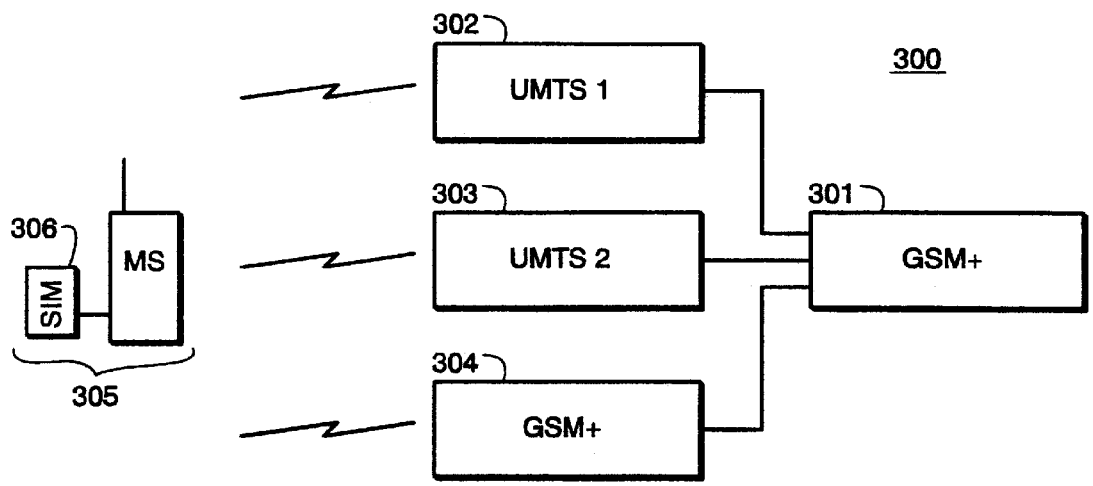
FIG. 3 illustrates a future form of a cellular radio system.
Figure 4:
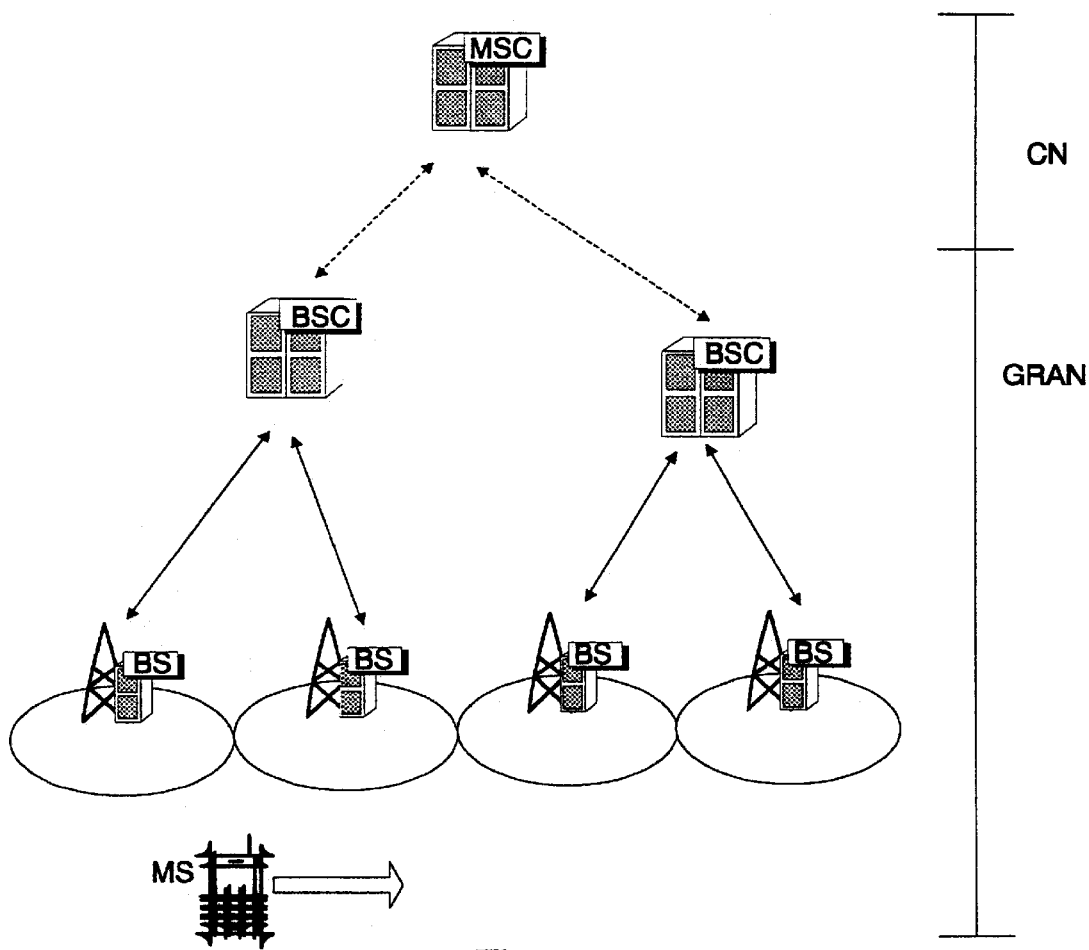
FIG. 4 illustrates a detail of FIG. 4.
Figure 5:
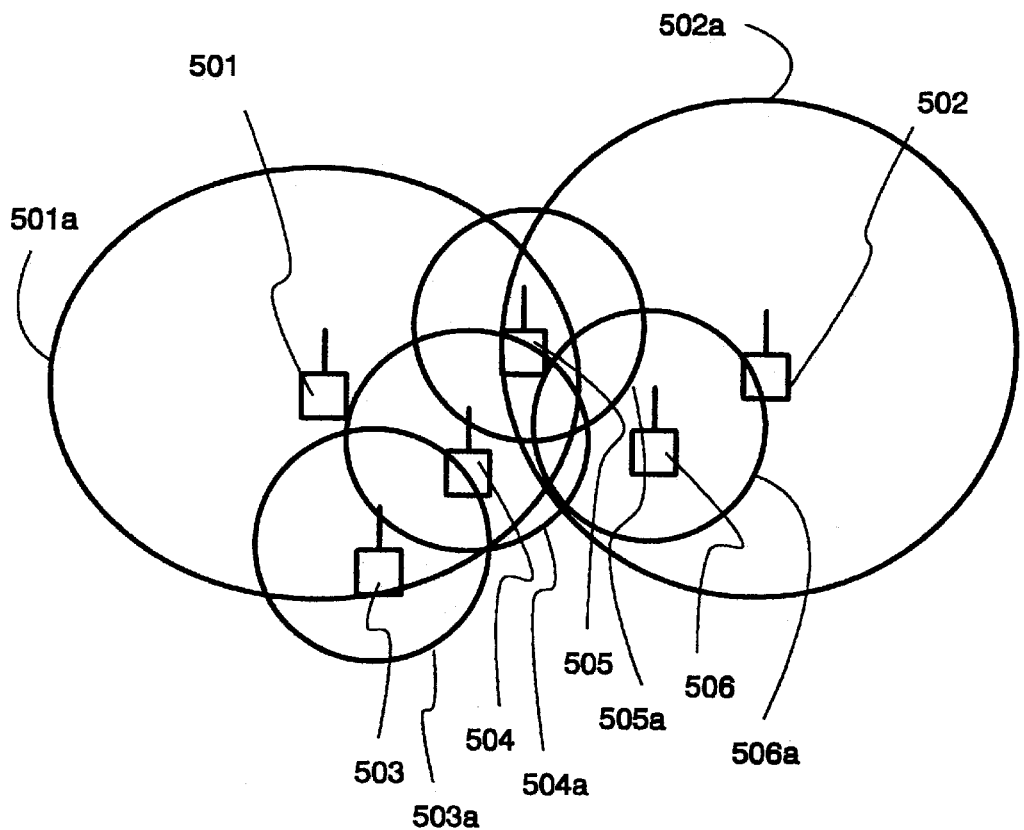
FIG. 5 illustrates some coverage areas in the order illustrated in the system according to FIG. 3.
Figure 6:
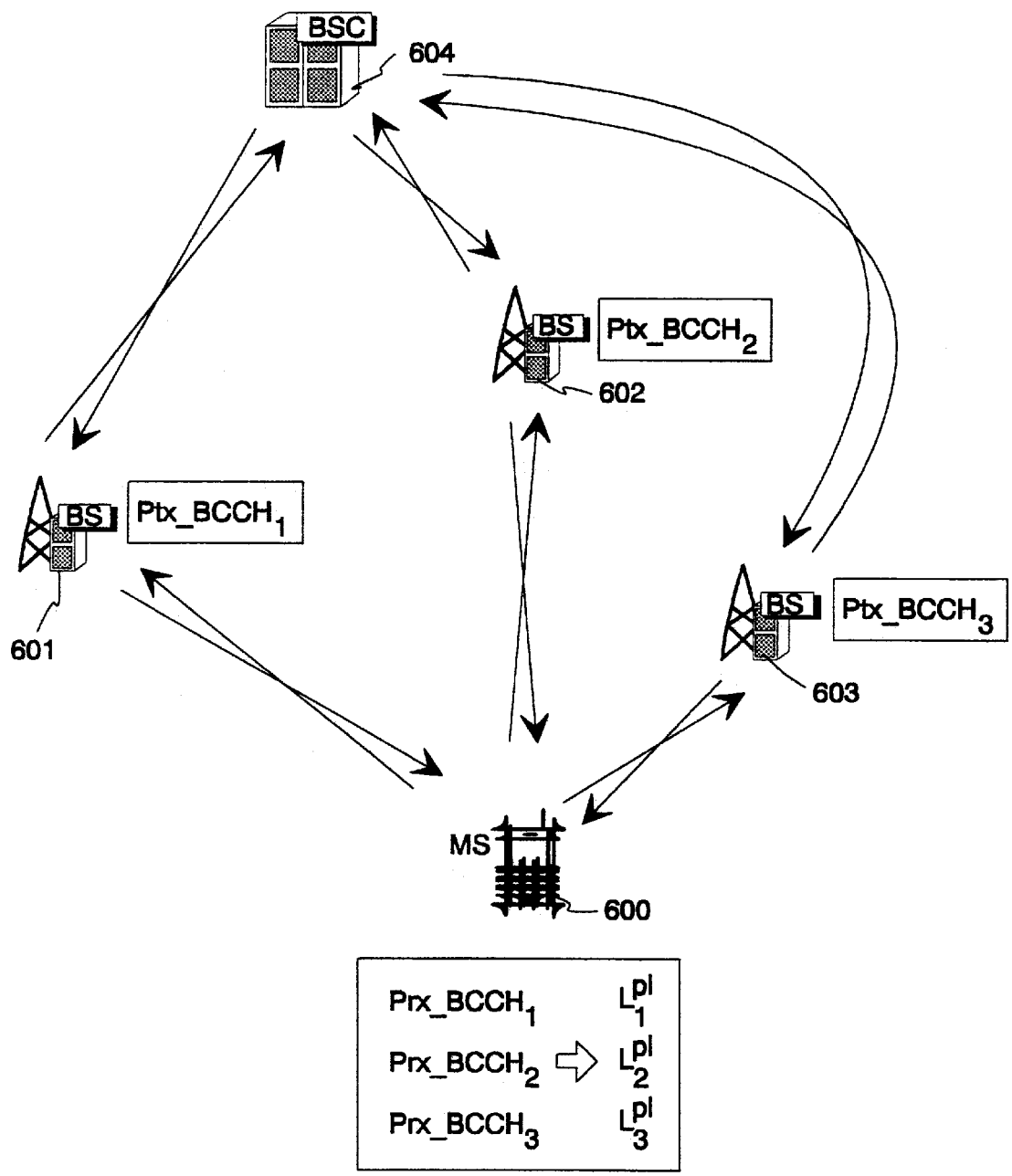
FIG. 6 illustrates the formation of certain parameters in a system according to the invention.

FIG. 6 illustrates a mobile station 600 which receives signals transmitted by the base stations 601, 602 and 603, particularly signals transmitted on a so-called broadcasting control channel BCCH. Each base station uses in its BCCH transmission a given transmission power which in the illustration is marked with symbol $Ptx\_BCCH_i$, where the subindex i obtains values 1, 2 and 3 with respect to the base stations 601, 602 and 603. The signals transmitted by the base stations fade in different manners on their way to the mobile station 600, which receives them at powers $Prx\_BCCH_i$, where the subindex i obtains values 1, 2 and 3. The mobile station 600 calculates the pathlosses $L_i^{Pl}$ per each base station according to the following formula:

$$L_i^{pl} = \frac{Prx\_BCCH_i}{Ptx\_BCCH_i} \quad (1)$$

Because the pathloss $L_i^{Pl}$ is defined as a ratio, it has no unit. The knowledge as to which BCCH transmission of the base stations it should receive, the mobile station 600 obtains from the current base station that includes in its transmission a list of the surrounding base stations in a known way. If the BCCH transmission power of the base stations is not constant in the system, the mobile station also obtains knowledge of the BCCH transmission power $Ptx\_BCCH_i$ used by each base station in a known way. The mobile station compiles a candidate list of all such base stations whose calculated pathloss is for the amount of a so-called handover marginal lower (i.e. parameter $L_i^{Pl}$ is higher) than the pathloss calculated for the current base station. Information of the measured pathlosses the mobile station can signal for the base stations and via them further to the radio network controller 604.

In order to describe the total transmission power, there is calculated a downlink transmission power parameter $Ptx_i^{inv,down}$ per each base station according to the following formula:

$$Ptx_i^{inv,down} = \frac{1}{N}\sum_{n,f} \frac{1}{P_{n,f}} \quad (2)$$

Instead of inverted frequencywise and slotwise powers, the powers can be used directly according to the following formula:

$$Ptx_i^{down} = \frac{1}{N}\sum_{n,f} P_{n,f} \quad (2a)$$

The unit of the transmission power parameter $Ptx_i^{inv,down}$ defined in formula (2) is $W^{-1}$, and the unit of the transmission power parameter $Ptx_i^{down}$ is W. Here we assume that the downlink transmission of each base station is compiled of frames with times slots and frequencies, so that $P_{n,f}$ is a transmission power used in a times slot n at a frequency f. Then total number of slots, defined by the time slot and frequency, contained in the frame is N. Thus, in formula (2) we take the inverted value of the power transmitted in each slot and add them together, whereafter the sum is divided by the total number of slots. According to another preferred embodiment, the value according to formula (2) can also be calculated for each time slot separately; this method is particularly suited for systems that do not use time slot hopping.

In order to describe the general interference level, there also is calculated the uplink interference power parameter $I_i^{inv,up}$ per each base station according to the following formula:

$$I_i^{inv,up} = \frac{1}{N}\sum_{n,f} \frac{1}{I_{n,f}} \quad (3)$$

As an alternative, there can even now be used the following formula based on non-inverted interference powers:

$$I_i^{up} = \frac{1}{N}\sum_{n,f} I_{n,f} \quad (3a)$$

The unit of the interference power parameter $I_i^{inv,up}$ also is $W^{-1}$ and the unit of the alternative interference power parameter $I_i^{up}$ is W. Thus in formula (3) there is measured the inverted value of the interference power received during each uplink slot, whereafter the obtained inverted values are added up, and the sum is divided by the total number of the slots. According to the second embodiment mentioned above, it is also possible to calculate a value according to formula (3) for each time slot separately.

When the values according to the formulas (2) and (3) are calculated, there can be estimated per each base station the downlink interference power that the mobile station would detect in the cell of the new base station. The downlink interference power $I^{inv,down}$ is estimated in units $W^{-1}$ according to the following formula:

$$I^{inv,down} = \sum_{i=1}^{M} \frac{Ptx_i^{inv,down}}{L_i^{pl}} \quad (4)$$

where M is the number of such new base stations included in the candidate list that operate at the same transmission frequency as the new base station under estimation. Again an alternative is the following formula:

$$I^{down} = \sum_{i=1}^{M} Ptx_i^{down} \cdot L_i^{pl} \quad (4a)$$

Now we can estimate the downlink C/I ratio that the mobile station would detect in the cell of the new base station (marked with the index i), according to the following formula:

$$(C/I)_i^{down} = Ptx^{down} \cdot L_i^{pl} \cdot \left( I^{inv,down} - \frac{Ptx_i^{inv,down}}{L_i^{pl}} \right) \quad (5)$$

As an alternative we have the formula:

$$(C/I)_i^{down} = \frac{Ptx^{down} \cdot L_i^{pl}}{\left( I^{down} - Ptx_i^{down} \cdot L_i^{pl} \right)} \quad (5a)$$

The C/I ratio does not have a unit, because it is a ratio. Here the symbol $Ptx^{down}$ without the subindex is used to denote the transmission power that the current base station uses when transmitting to the mobile station.

Respectively, the uplink C/I ratio in the cell of the new base station marked with the index i can be estimated from the formula:

$$(C/I)_i^{up} = Ptx^{up} \cdot L_i^{pl} \cdot \left( I^{inv,up} - \frac{Ptx_i^{inv,up}}{L_i^{pl}} \right) \quad (6)$$

where the symbol $Ptx^{up}$ without subindex denotes the transmission power that the mobile station uses when transmitting to the current base station. As an alternative, we have the following formula:

$$(C/I)_i^{up} = \frac{Ptx^{up} \cdot L_i^{pl}}{\left( I^{up} - Ptx_i^{up} \cdot L_i^{pl} \right)} \quad (6a)$$

The alternative formulas presented above are alternative according to the principle that there must be applied either the formulas 2–6 or 2a–6a exclusively.

In order to describe the base station loads, many different definitions can be used. We have found it advantageous to use load parameters that describe the quantity of the data transmission capacity available at the base station separately for services requiring real-time data transmission and services requiring non-real-time data transmission. Let us define the load parameter $f_i^{NRT}$ relating to non-real-time data transmission by means of the formula:

$$f_i^{NRT} = \frac{C_{tot} - C_{tot}^{RT}}{U_i^{NRT} + 1} \quad (7)$$

where $C_{tot}$ is the highest possible number of slots in the currently used frame structure, and $CR_{tot}^{RT}$ is the number of the slots that are allocated to real-time data transmission among these. The frame structure can conform for instance to a structure that is introduced in the Finnish patent application No. 964,308 and in the respective U.S. patent application Ser. No. 802,645 filed on Feb. 19th, 1997, so that the number and size of the slots contained therein may vary. In order to ensure unambiguity, the C-factors presented in formula (7) are advantageously expressed so that the employed unit is the smallest allowed slot size, which can be for instance 1/64 of the frame capacity. In formula (7), the symbol $U_i^{NRT}$ denotes the number of active non-real-time bearers passing through said base station. Here the concept 'bearer' means an entity formed by all such factors that affect the data transmission between the base station and a given mobile station. The concept 'bearer' includes, among others, data transmission rate, delay and bit error ratio as well as fluctuations in these within given minimum and maximum values. The bearer can be understood as a data transmission path created due to the combined effect of all these factors, said path connecting the base station and a given mobile station, and through which path it is possible to transmit useful data, i.e. payload information. Multiple function mobile stations can simultaneously maintain several bearers that connect the mobile station to one or several base stations.

The load parameter $f_i^{RT}$ related to real-time data transmission can be defined by the formula:

$$f_i^{RT} = \begin{cases} 1 & \text{if} \quad C_{tot} - C_{tot}^{RT} \geq S \\ 0 & \text{else} \end{cases} \quad (8)$$

where S is the number of the slots that are reserved for the mobile station in the connection with the current base station. The factor S must be given in the same units as the C factors. The load parameters according to the formulas (7) and (8) can be defined separately for the uplink and downlink directions so that in the formulas the C factors and the U factor in formula (7) only apply in the transmission direction in question, and the load factors are provided with an extra superscript "up" or "down".

According to the invention, for those base stations that have been accepted on the candidate list on the basis of the pathloss measurement there is calculated an estimate according to which the base stations are put in a mutual priority order. In calculating the estimate, there are used the load factors and the estimated C/I ratios. An advantageous formula for calculating the base-stationwise estimate $W_i$ is:

$$W_i = 10 \log_{10}([f_i^{RT,down} \cdot f_i^{NRT,down} \cdot (C/I)_i^{down}]^a \cdot [f_i^{RT,up} \cdot f_i^{NRT,up} \cdot (C/I)_i^{up}]^b) \quad (9)$$

which gives the value $W_i$ in decibels. By selecting the exponents a and b, there is defined which transmission direction (uplink or downlink) is more dominant with respect to the choice of the new base station, or whether both transmission directions are equally important. Instead of a and b, the exponents of the clauses inside the square brackets in formula (9) can also be defined in the form (1+a/64) and (1−a/64), where number a is an integer within the range[−64, 64]. Thus we achieve a higher accuracy, particularly if the number a must be signalled from one terminal of the cellular radio system to another in a message where a very limited quantity of bits is reserved for representing it. Suitable values for the exponents can be found by way of trial.

The principle is that the base station that has the highest calculated estimate $W_i$ is chosen as the new base station. In order to prevent the mobile station from ping-ponging back and forth between two such base stations i and j that have equally high calculated estimates $W_i$ and $W_j$, it can be required that the estimate calculated. for the new base station must be H decibels higher than the estimate calculated for the current base station, where H is a positive real number other than zero. Another possibility is to include in the calculation of the pathloss and/or in the estimation of the C/I ratio a moving averaging in relation to time, which decreases the possibility of obtaining exactly the same result for two base stations.

In the above description we have not commented on the question in which parts of the cellular radio system the calculations and estimations required by the system are realised. The pathloss measurements are most advantageously carried out in the mobile station, because the base station transmit regularly a BCCH signal or a corresponding signal with a known transmission power, wherefore the pathloss is easily measured on the basis of this. The calculations according to the formulas (2) and (3) are most advantageously made by the base stations, because they have knowledge of the frame structure and of the transmission power used in the different slots thereof. Likewise, it is easy to integrate in the base station a measuring receiver that measures the received interference power required by formula (3) during the different slots of the frame structure. The calculations according to the formulas (4)–(9) can be carried out for instance in the radio network controller, naturally on the precondition that the mobile stations and the base stations signal the measured and calculated information for the radio network controller. After calculating the estimates according to formula (9), the radio network controller should, when necessary, send the mobile station a command for handover via some base station.

The calculations according to the formulas (4)–(9) could also be carried out in the mobile station, but this would require a fairly large calculation capacity of the mobile station. Furthermore, the calculations according to the formulas (4)–(9) could also be made in some base station, but this would require a considerably extensive signalling between the base stations. Naturally the cellular radio system can also be provided with some device not illustrated in the above diagrams; the task of this device would be to receive signalling related to the measurement results and to carry out calculations according to the formulas (4)–(9), as well as to give commands for executing handover.

The invention does not require that all described calculations and estimations are used in connection with every handover. The decision of a new base station can even be made on the basis of pathloss measurements alone, if the part in the cellular radio system that makes the handover-related calculations is so loaded that all calculations cannot be made, or if there is some other reason for making a simpler decision related to handover (for example the number of potential new base stations is only one).

Figure 7:
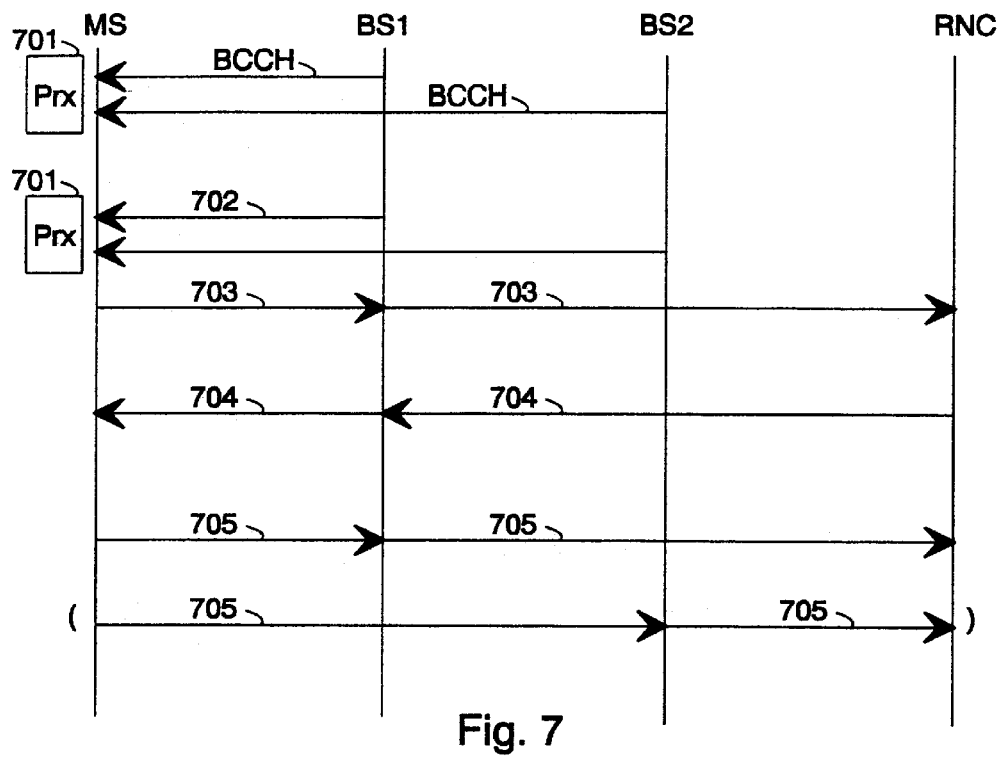
FIG. 7 illustrates signalling in a preferred embodiment of the invention.

Next we shall observe signalling needs according to FIG. 7 in the exemplary embodiment where the calculations according to the formulas (4)–(9) are carried out by the radio network controller. The mobile station MS performs the received power measurements 701 connected to the pathloss calculations at given intervals, when the pathloss conditions change or after the base station BS has sent a command 702 to this effect. The base station can send said command 702 for example after detecting a change in the transmission power or interference power situation (formulas (2) ja (3)). As a result of the measurement, the mobile station sends the base station and therethrough further to the radio network controller RNC a measuring message 703 containing measurement data of all base stations included in the candidate list. A possible measuring command 702, by which the base station can command the mobile station to carry out the pathloss measurements, contains information as to which base stations are included in the candidate list. When the base station has transmitted the measuring message 703 to the radio network controller, the radio network controller sends, when necessary, to the mobile station a handover command 704, which in a known way contains all the information that the mobile station needs in order to start data transmission with the new base station. The mobile station acknowledges the handover command by sending the radio network controller an acknowledgement message 705 either via the old or the new base station.

Figure 8:
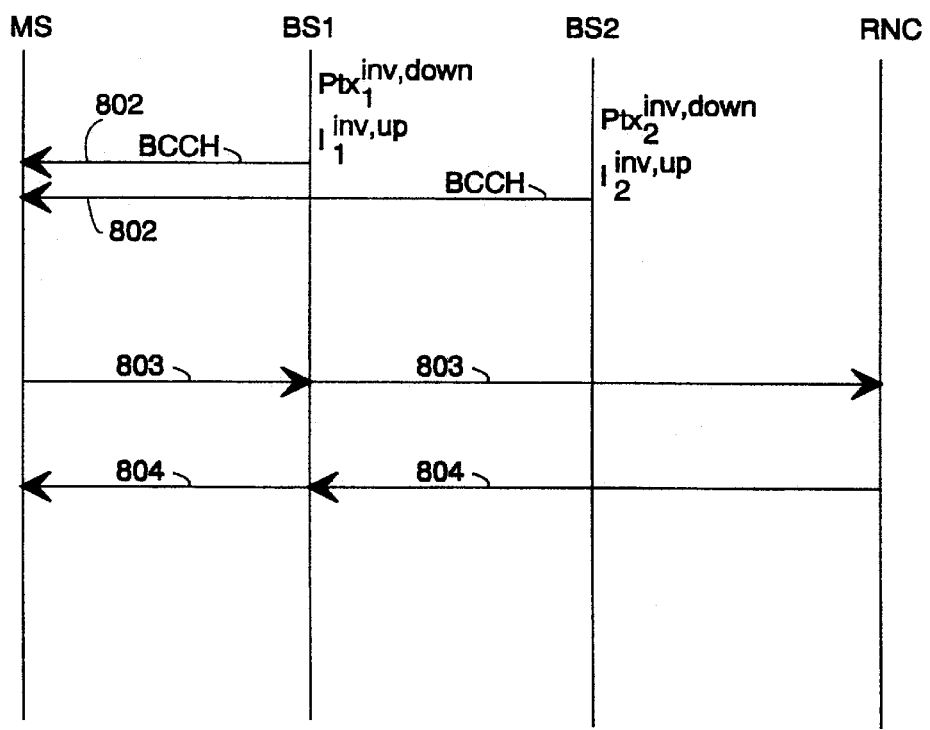
FIG. 8 illustrates signalling in another preferred embodiment of the invention.

FIG. 8 illustrates signalling in an alternative embodiment, where the mobile station takes the initiative for handover. Via the BCCH channels transmitted by base stations included in the candidate list, the mobile station obtains information 802 of the transmission power and interference power measurements carried out by the base stations. If the mobile station decides to execute a handover, it sends a message 803 to this effect to the radio network controller via the base station. The radio network controller sends an acknowledgement message 804, where it either accepts or rejects the handover.

In a situation where the mobile station suddenly looses connection with the current base station, or when the mobile station is switched on, and it has no current base station, the connection is set up between the mobile station and that base station which transmits the strongest BCCH signal or a corresponding signal.

As a conclusion, the following table contains all such information that is transmitted in a method according to a preferred embodiment of the invention (the decision of handover is made either in the mobile station or in the radio network controller) as signalling between the mobile station, the base station and the base station controller.

| From base station to mobile station | Time of signalling |
| --- | --- |
| handover marginal (dB) | at the beginning of connection |
| candidate group | for example a change in the transmission power or interference power situation (formulas (2) ja (3)) |
| command to execute handover | in connection with handover |
| acknowledgement message of handover | in connection with handover |
| transmission power of the BCCH channel | regularly on the BCCH channel |
| $Ptx_i^{inv,down}$ or $Ptx_i^{down}$ | regularly on the BCCH channel |
| $I_i^{inv,up}$ or $I_i^{up}$ | regularly on the BCCH channel |

| From mobile station to base station | Time of signalling |
| --- | --- |
| received BCCH power of the current cell | regularly in packets |
| received BCCH power of other | regularly/after request from base |

-continued

| | |
|---|---|
| cells on the candidate list | station/after power change |
| mobile station speed | regularly/after request from base station/after change in rate |
| initiative for handover | in connection with handover |
| acknowledgement message of handover | in connection with handover |
| From base station to radio network controller | Time of signalling |
| $Ptx_i^{inv,down}$ or $Ptx_i^{down}$ | for example at 100 ms intervals |
| $I_i^{inv,ip}$ or $I_i^{up}$ | for example at 100 ms intervals |

For a man skilled in the art it is obvious that the above used specific terms, such as "BCCH channel", are only meant for illustrating possible applications of the invention, and they do not restrict the invention in any way.

What is claimed is:

1. A method for executing handover from an old base station to a new base station in a cellular radio system comprising base stations and mobile stations, the method comprising the steps of:

selecting a group of potential new base stations;

estimating a carrier to interference ratio that each of the potential new base stations included in the group could offer; and using the estimated carrier to interference ratio to make a decision about the new base station of the handover, wherein there are separately estimated the carrier to interference ratio that each of the potential new base stations included in the group could offer to connections requiring real-time data transmission, and a carrier to interference ratio that each of the potential new base stations could offer to connections requiring non-real-time data transmission.

2. A method according to claim 1, wherein there are separately estimated the carrier to interference ratio that each of the potential new base stations included in said group could offer to uplink connections, and a carrier to interference ratio that each of the potential new base stations could offer to downlink connections.

3. A method according to claim 1, wherein there also is measured the load situation of each potential new base station included in said group, and the measured load situation of each potential new base station included in said group is used together with the estimated carrier to interference ratio in making said decision about the new base station of the handover.

4. The method of claim 1 wherein the step of estimating a carrier to interference ratio further comprises the steps of estimating a carrier to interference ratio using a carrier power the base station uses to transmit to the mobile station and an interference power occurring simultaneously to predict how high an achieved carrier to interference ratio would be between the base station and the mobile station both in an uplink and a downlink direction.

5. The method of claim 1, wherein the step of estimating the carrier to interference ratio further comprises the step of estimating the carrier to interference ratio separately for an uplink direction and a downlink direction, wherein the estimate for the uplink direction is weighted differently than the estimate for the downlink direction.

6. The method of claim 1 further comprising the step of calculating a load factor for the new base station that indicates a data transmission capacity available at the new base station.

7. A method according to claim 3 wherein there are separately measured the load situation of each potential new base station included in said group in the uplink direction, and the load situation of each potential new base station included in said group in the downlink direction.

8. A method according to claim 3, wherein the step of making said decision about the new base station of the handover comprises the substep of making an estimate of each potential new base station included in said group, said estimate describing both the carrier to interference ratio that said base station could offer, and the load situation of said base station, whereafter the chosen new base station is the one with the most favourable estimate.

9. A method for executing handover from an old base station to a new base station in a cellular radio system comprising base stations and mobile stations, the method comprising the steps of:

selecting a group of potential new base stations;

estimating a carrier to interference ratio that each of the potential new base stations included in the group could offer; and using the estimated carrier to interference ratio to make a decision about the new base station of the handover, wherein there are separately measured the load situation of each potential new base station included in the group in relation to connections requiring real-time data transmission, and the load situation of each potential new base station included in the group in relation to connections requiring non-real-time data transmission; and wherein there also is measured the load situation of each potential new base station included in the group, and the measured load situation of each potential new base station included in the group is used together with the estimated carrier to interference ratio in making the decision about the new base station of the handover.

10. A method for executing handover from an old base station to a new base station in a cellular radio system comprising base stations and mobile stations, the method comprising the steps of:

selecting a group of potential new base stations;

estimating a carrier to interference ratio that each of the potential new base stations included in the group could offer; and using the estimated carrier to interference ratio to make a decision about the new base station of the handover;

calculating a load factor for the new base station that indicates a data transmission capacity available at the new base station wherein the load factor comprises a load parameter connected to real-time data transmission and a load parameter connected to non-real-time data transmission.

11. A method for executing handover from an old base station to a new base station in a cellular radio system comprising base stations and mobile stations, the method comprising the steps of:

selecting a group of potential new base stations;

estimating a carrier to interference ratio that each of the potential new base stations included in the group could offer; and using the estimated carrier to interference ratio to make a decision about the new base station of the handover;

calculating a load factor for the new base station that indicates a data transmission capacity available at the new base station, wherein the load parameter connected to real-time data transmission indicates whether the data transmission capacity available at the new base station is a large a data transmission capacity for the mobile station at a current base station.

12. A method for executing handover from an old base station to a new base station in a cellular radio system comprising base stations and mobile stations, the method comprising the steps of:

selecting a group of potential new base stations;

estimating a carrier to interference ratio that each of the potential new base stations included in the group could offer; and using the estimated carrier to interference ratio to make a decision about the new base station of the handover; calculating a load factor for the new base station that indicates a data transmission capacity available at the new base station, wherein the load parameter connected to the non-real-time data transmission indicates a size of an available share of the data transmission capacity of the new base station allocated for non-real-time transmission.

13. A method for executing a handover from an old base station to a new base station in a cellular radio system comprising the steps of:

selecting a group of potential new base stations from a plurality of base stations in the system;

estimating a carrier to interference ratio for each new base station, the estimated carrier to interference ratio being based on a total transmission power used by a respective base station, a measured signal loss between the respective base station and a mobile station, an interference level prevailing a cell area of the respective base station and a free data transmission capacity available in the respective base station; and selecting the new base station by using the estimated carrier to interference ratio, the selection of the new base station occurring if the estimate for the new base station is a predetermined level above an estimate calculated for the current base station.

14. A method for executing handover from an old base station to a new base station in a cellular radio system comprising base stations and mobile stations, the method comprising the steps of:

selecting a group of potential new base stations;

estimating a carrier to interference ratio that each potential new base station in the group of base stations could offer to connections requiring real-time data transmission; and estimating a carrier to interference ratio that each potential new base station could offer to connections requiring non-real-time data transmission; and making a decision about the new base station of the handover using at least one of the estimated carrier to interference ratios.

15. A cellular radio system including base stations and mobile stations and facilitating handovers from an old base station to a new base station, said cellular radio system comprising means for estimating a carrier to interference ratio that a potential new base station belonging to a given group of potential new base stations could offer to connections requiring real-time data transmission and a carrier to interference ratio that a potential new base station belonging to a given group of potential new base stations could offer to connections requiring non-real-time data transmission, in order to select a new base station in a handover.

* * * * *